(12) United States Patent
Daughtry et al.

(10) Patent No.: US 6,326,848 B1
(45) Date of Patent: Dec. 4, 2001

(54) CIRCUITS AND METHODS FOR MONITORING A SIGNAL IN A NETWORK

(75) Inventors: Earl A. Daughtry, Lawrenceville; Peter Sung Tri Hoang, Alpharetta, both of GA (US)

(73) Assignee: ADC Telecommunications, Inc.

( * ) Notice: Subject to any disclaimer, the term of this patent is extended or adjusted under 35 U.S.C. 154(b) by 0 days.

(21) Appl. No.: 09/702,418

(22) Filed: Oct. 31, 2000

Related U.S. Application Data

(63) Continuation of application No. 09/121,244, filed on Jul. 23, 1998, now Pat. No. 6,160,452.

(51) Int. Cl.[7] .................................................... H03F 3/16
(52) U.S. Cl. ............................................. 330/277; 330/292
(58) Field of Search ................................... 330/277, 292, 330/302

(56) References Cited

U.S. PATENT DOCUMENTS

| | | |
|---|---|---|
| 3,388,338 | 6/1968 | Austin . |
| 3,528,023 | 9/1970 | Jeffers . |
| 3,796,952 | 3/1974 | Bayer . |
| 4,075,576 | 2/1978 | Eden . |
| 4,160,134 | 7/1979 | Carroll . |
| 4,178,559 | 12/1979 | Nichols . |
| 4,849,710 * | 7/1989 | Vo ......................................... 330/277 |
| 5,220,419 | 6/1993 | Sklar et al. . |
| 5,349,304 | 9/1994 | Ryat . |
| 5,392,004 * | 2/1995 | Masliah ............................... 330/296 |
| 5,831,476 * | 11/1998 | Buer et al. ............................... 330/2 |
| 5,892,400 * | 4/1999 | Van Saders et al. ................. 330/277 |
| 6,046,641 * | 4/2000 | Chawla et al. ....................... 330/277 |

FOREIGN PATENT DOCUMENTS 281113   9/1988   (EP) .

* cited by examiner

*Primary Examiner*—Robert Pascal
*Assistant Examiner*—Henry Choe
(74) *Attorney, Agent, or Firm*—Fogg, Slifer & Polglaze, P.A.

(57) ABSTRACT

A monitoring circuit is provided. The monitoring circuit can be used to monitor signals in a cable network. The monitoring circuit includes first and second stages. The first stage has an input and an output. The input is coupled to an external circuit. The first stage scales a voltage received at its input. The second stage is coupled to the output of the first stage. The second stage has a high input impedance and a low output impedance. The second stage buffers a signal at the output of the first stage to an output of the second stage.

66 Claims, 2 Drawing Sheets

CIRCUITS AND METHODS FOR MONITORING A SIGNAL IN A NETWORK

This is a continuation of application Ser. No. 09/121,244, filed Jul. 23, 1998, , now U.S. Pat. No. 6,160,452 which is incorporated herein by reference.

TECHNICAL FIELD OF THE INVENTION

The present invention relates generally to the field of communications and, in particular, to circuits and methods for a monitoring circuit in a network amplifier.

BACKGROUND

Coaxial cable networks are a common medium that is used to distribute video and audio programming to consumers with a higher quality than is typically achieved using conventional antennas connected to a television at each user's location. A cable network typically includes a head end that receives inputs or programming from a number of content providers, e.g., ABC, NBC, CBS, Fox, CNN, ESPN, etc. The head end is typically connected to a distribution network that distributes the programming from the head end to, for example, the television sets of a number of end users. The distribution network can include coaxial cable alone or in combination with optical fiber, or other distribution medium.

Radio frequency (RF) signals transmitted over a coaxial cable portion of the distribution network tend to attenuate as a function of distance from the head end. This means that the RF signals decrease in quality as they get further away from the head end. To compensate for this attenuation, cable networks typically include network amplifiers that are selectively distributed throughout the network. These amplifiers receive and amplify the RF signals at these selected points in the network such that the signals provided to each end user provide an acceptable level of quality.

Network amplifiers typically include two or more "monitoring circuits" that allow a network operator to monitor RF signals transmitted over the network and within the amplifier. Conventionally, a monitoring circuit uses a directional coupler that is placed within the RF signal path of the amplifier. The directional coupler includes a transformer, such as a double aperture balun device. The directional coupler couples monitored RF signals from the amplifier's RF signal path to, e.g., a test point connector, or an input of another circuit. The monitored RF signals are typically scaled down by a selected factor at the test point connector, e.g., 20 decibel (dB).

Network amplifiers conventionally include a monitoring circuit that is associated with the input port and a monitoring circuit that is associated with the output port of the amplifier. Further, the amplifier may also include other monitoring circuits that are used to provide internal feedback signals to circuits of the network amplifier such as an automatic gain control (AGC) circuit. The AGC circuit adjusts the level of the gain of the network amplifier so that the output is within an acceptable range.

One drawback with conventional monitoring circuits is a 1 dB maximum insertion loss created in the RF signal path of the amplifier by the monitoring circuit. This means that the monitoring circuit reduces or attenuates the RF signal output by the amplifier. This loss in signal strength reduces the effectiveness of the amplifier. This insertion loss is additive and applies to each monitoring circuit. Thus, a network amplifier with input, output and AGC monitoring circuits produce 3 dB reduction in signal strength. Additional monitoring circuits further increase the RF signal reduction.

Conventional attempts to overcome the RF signal reduction can add to or complicate other problems with the amplifier. For example, simply increasing the gain of the amplifier can be used to compensate for the 1 dB reduction caused by a monitoring circuit. However, the intermodulation distortion of the amplifier increases by 2 to 3 dB for every 1 dB in increase of the output level of the network amplifier. The intermodulation distortion is important to the perceived video fidelity of the composite signal in the cable network.

Use of a conventional monitoring circuit at the input of a network amplifier can add up to 1 dB of noise figure to the preamplifier noise figure for the network amplifier. Operating noise figure is an important factor is determining where to place amplifiers in a given network.

One additional problem with conventional monitoring circuits is that the directional couplers used have a limited bandwidth. That is, the directional coupler can only handle signals over a limited frequency range; typically, 5 to 860 MHZ with ±0.25 dB flatness. Currently, cable networks plan to expand the frequency range of the channels offered to go as high as 1000 MHZ. This will make the directional coupler a limiting factor in monitoring circuits.

For the reasons stated above, and for other reasons stated below which will become apparent to those skilled in the art upon reading and understanding the present specification, there is a need in the art for a circuit for monitoring RF signals in a network amplifier with reduced insertion loss and higher bandwidth capability.

SUMMARY OF THE INVENTION

The above mentioned problems with network amplifiers and other problems are addressed by the present invention and will be understood by reading and studying the following specification. A monitoring circuit is described which uses an active coupler to monitor signals in a network amplifier.

In particular, an illustrative embodiment of the present invention includes a monitoring circuit. The monitoring circuit can be used to monitor signals in a cable network. The monitoring circuit includes first and second stages. The first stage has an input and an output. The input is coupled to an external circuit. The first stage scales a voltage received at its input. The second stage is coupled to the output of the first stage. The second stage has a high input impedance and a low output impedance. The second stage buffers a signal at the output of the first stage to an output of the second stage.

In another embodiment, a monitoring circuit is provided. The monitoring circuit includes a voltage divider. The voltage divider has an input for coupling to a node of an external circuit and has an output. The voltage divider further includes a buffer circuit. The buffer circuit is coupled to the output of the voltage divider. The buffer circuit includes a field effect transistor with a gate coupled to the output of the voltage divider. The transistor is configured as a common-drain amplifier such that the source of the transistor provides an output of the monitoring circuit.

In another embodiment, a network amplifier is provided. The network amplifier includes an input port, an output port, and an amplifier circuit. The amplifier circuit is coupled between the input port and the output port along a signal path of the network amplifier. At least one monitoring circuit is coupled to the signal path. The monitoring circuit includes a first stage and a second stage. The first stage has an input and an output. The input of the first stage is coupled to the signal path. The first stage scales a voltage received at its input. The second stage is coupled to the output of the first stage. The second stage has a high input impedance and a low output impedance so as to buffer a signal at the output of the first stage to an output of the second stage.

In another embodiment, a method for monitoring a signal in a signal path of a cable network is provided. The method includes tapping the signal from the signal path of the cable network. The level of the tapped signal is reduced and buffered to provide an output of the circuit.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

Figure 1:
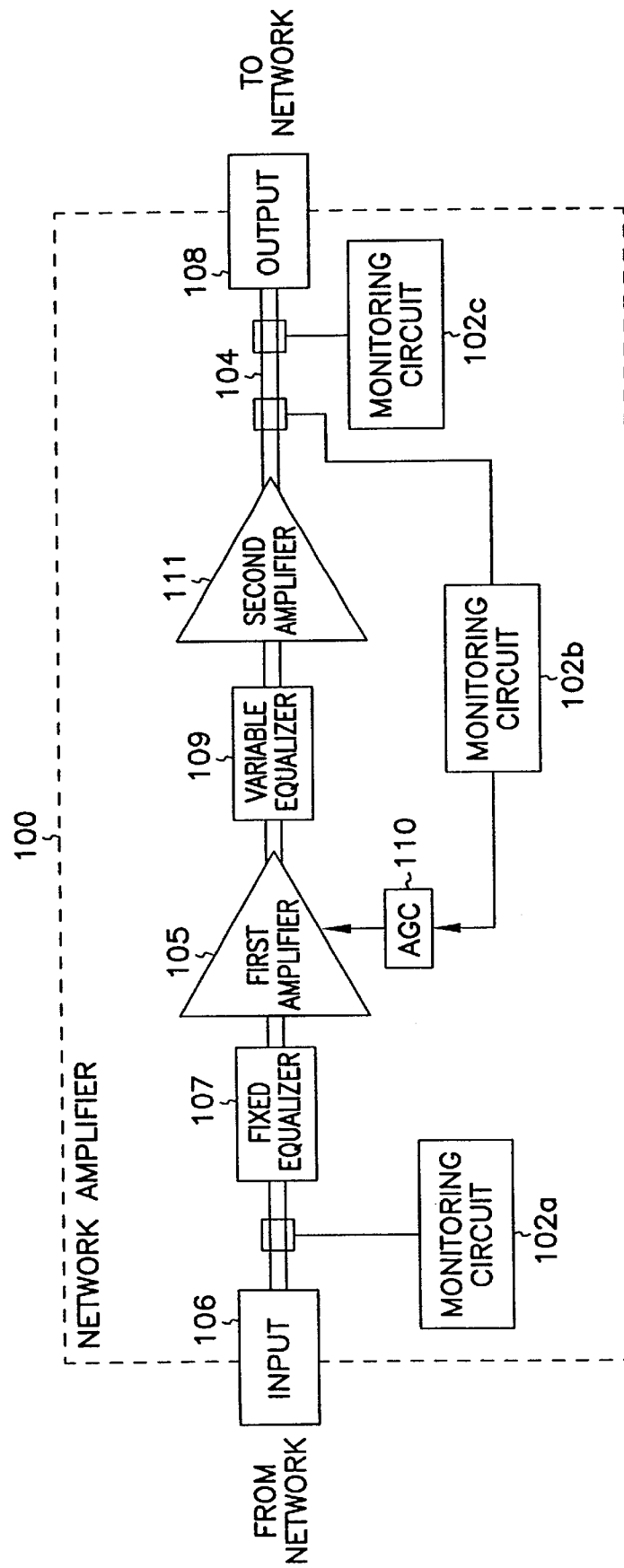
FIG. 1 is a block diagram of an embodiment of a network amplifier according to the teachings of the present invention.

FIG. 1 is a block diagram of an embodiment of a network amplifier, indicated generally at 100, constructed according to the teachings of the present invention. Network amplifier 100 is used to amplify signals in a network such as a cable television network. Network amplifier 100 includes a number of monitoring circuits 102a, 102b, and 102c that monitor signals in amplifier 100. For example, monitoring circuit 102a monitors signals in main path 104 at input port 106 of amplifier 100. Similarly, monitoring circuit 102c monitors signals in main path 104 at output port 108. Monitoring circuit 102b monitors signals in main path 104 and provides the signals to automatic gain control (AGC) circuit 110. AGC circuit 110 controls the gain of network amplifier 100 in response to signals monitored in path 104. Monitoring circuits 102a, 102b, and 102c each use a field effect transistor to monitor the signals in path 104 in order to avoid the problems with conventional monitoring circuits described in detail above.

Network amplifier 100 includes, in one embodiment, fixed equalizer 107, first amplifier 105, variable equalizer 109 and second amplifier 111 that are coupled in series along path 104. It is understood that these elements in path 104 are provided by way of illustration and not by way of limitation. Other arrangements and other elements can be used in this path to appropriately amplify the signal in path 104. Further, the number of monitoring circuits can be varied without departing from the scope of the present invention.

Figure 2:
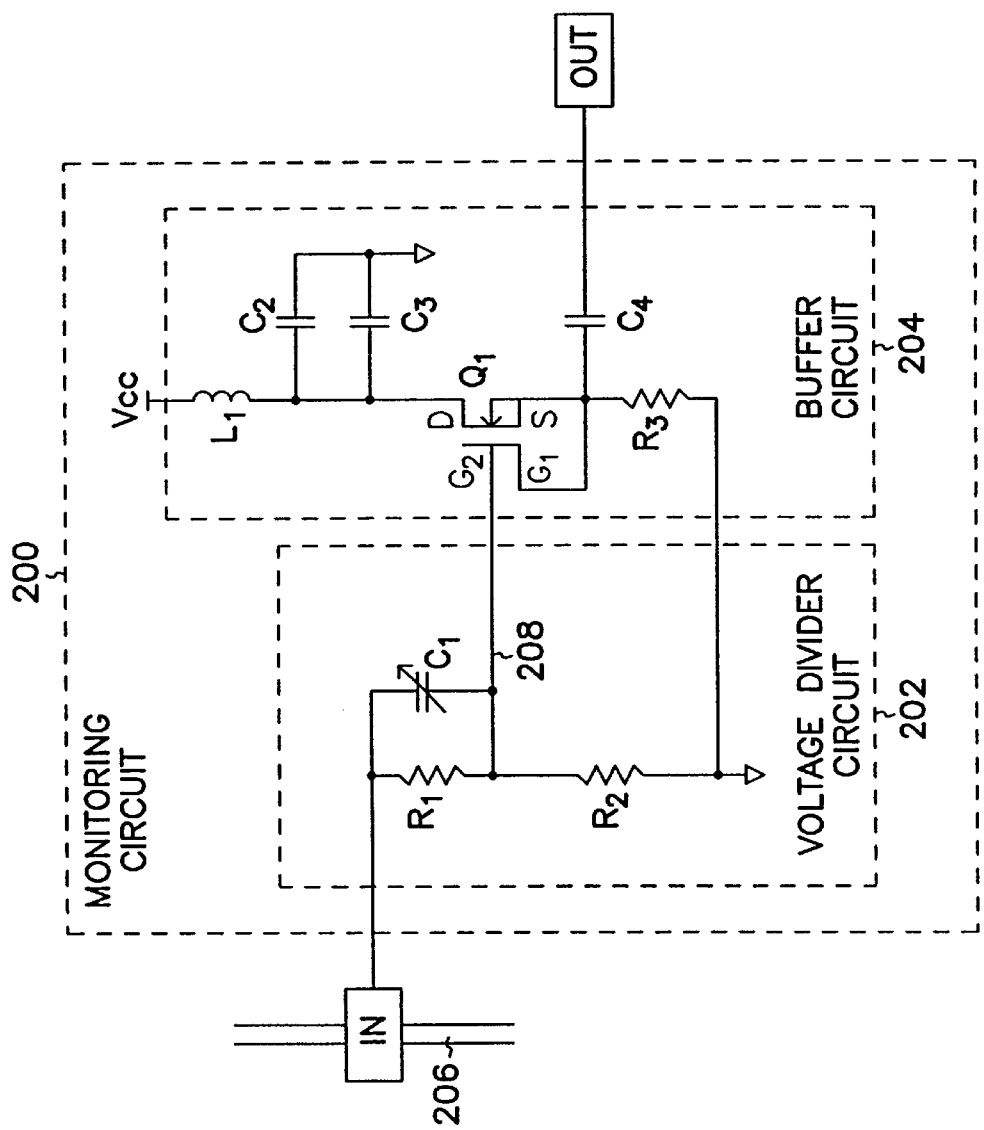
FIG. 2 is a schematic diagram of an embodiment of an active coupler for monitoring signals in a network amplifier according to the teachings of the present invention.

FIG. 2 is a schematic diagram of a monitoring circuit, indicated generally at 200, and constructed according to the teachings of the present invention. Advantageously, monitoring circuit 200 provides a wide-band, non-invasive technique for monitoring RF signals in an amplifier of a cable network with substantially no insertion loss. Monitoring circuit 200 includes two main portions; namely, voltage divider circuit 202 and buffer circuit 204. Monitoring circuit 200 is formed, for example, on a printed circuit board with input node (IN) coupled to main signal path 206 of, for example, an amplifier circuit such as amplifier 100 of FIG. 1. Input node IN comprises an electrical connection between signal path 206 and voltage divider circuit 202. In this embodiment, voltage divider 202 comprises a high impedance signal tap for monitoring circuit 200.

Voltage divider circuit 202 is used to reduce the signal level at input node IN down to a level appropriate for monitoring equipment, e.g., −20 dB. Voltage divider circuit 202 includes first and second resistors $R_1$ and $R_2$ that are connected in series between IN and ground such that resistors $R_1$ and $R_2$ form a voltage divider with an output at node 208. The values of $R_1$ and $R_2$ determine the voltage division factor, K, for voltage divider circuit 202 according to the following equation:

$$K = \frac{R_2}{(R_1 + R_2)}$$

The values of resistors $R_1$ and $R_2$ are chosen such that $R_1$ is much greater than $R_2$. Further, the coupling value for voltage divider circuit 202 is calculated according to the equation:

$$X = 201 \text{ og}(K)$$

In order to not load down the RF signal at the input node IN, the series combination of resistors $R_1$ and $R_2$ must be at least 10 times the characteristic impedance of the RF input (path 206), e.g., 10 times 75 ohms.

Voltage divider circuit 202 also provides transient surge protection to buffer circuit 204 by reducing the current with $R_1$, and the voltage with the factor K.

Optionally, capacitor $C_1$ is coupled in parallel with resistor $R_1$. The circumstances in which capacitor $C_1$ is used are described in detail below.

Buffer circuit 204 is included to reduce the loading effects of the monitoring equipment on the output of voltage divider 202. To this end, buffer circuit 204 includes high input impedance field-effect transistor $Q_1$. In one embodiment, transistor $Q_1$ is a gallium arsenide (GaAs) metal semiconductor field-effect transistor (MESFET), with a built-in static protection diode. Other appropriate transistors with high input impedance can be used in place of the gallium arsenide MESFET. To provide high input impedance and low output impedance, the MESFET transistor is configured as a common-drain amplifier. A gate of transistor $Q_1$ is coupled to node 208. A source of transistor $Q_1$ is coupled through resistor $R_3$ to ground. The source of transistor $Q_1$ is coupled through dc blocking capacitor $C_4$ to an output node (OUT). The signal at output node OUT can be passed, for example, to a 75 ohm test probe or other appropriate load.

Capacitors $C_2$ and $C_3$ are coupled in parallel between the drain of transistor $Q_1$ and ground to provide broadband RF bypassing for buffer circuit 204. Inductor $L_1$ is a choke to prevent the RF signals of monitoring circuit 200 from affecting the power supply, $V_{cc}$.

Due to the combined parasitic capacitance of the gate ($C_{gs}$) and the static protection diode in the MESFET embodiment, the output of monitoring circuit 200 at the output node may not be flat across the frequency spectrum of the signals processed by the associated amplifier. Capacitor $C_1$ of voltage divider circuit 202 can be adjusted to improve the flatness of the output of monitor circuit 200.

In operation, monitoring circuit 200 passes a signal from path 206 at input node (IN) to output node (OUT) with a specified attenuation for monitoring signals on signal path 206. In one embodiment, the attenuation is 20 dB to allow conventional testing/monitoring equipment to be coupled to output node (OUT). Voltage divider circuit 208 divides the signal from input node IN down to an attenuated voltage at node 208. This signal is passed to output node OUT by transistor $Q_1$ where it is provided to a test probe or other appropriate circuit.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, the monitoring circuit can be used in a number of applications. For example, the monitoring circuit can be used to monitor an output signal to determine automatic gain/slope control settings for a distribution amplifier. Further, the monitoring circuit can be used as a test mode monitoring point at either the input or output of an amplifier. The monitoring circuit can also be used as the forward path status monitoring pick-off point to receive control signals from the head end. The monitoring circuit can be used in other appropriate applications. The blocking capacitor ($C_4$) can be removed. Further, the adjustable capacitor ($C_1$) of FIG. 2 can be removed when parasitic capacitance at node 208 is deemed sufficiently small.

What is claimed is:

1. A monitoring circuit, comprising:
    an input coupled to receive an input signal from a radio frequency signal path;
    a voltage divider circuit having an input coupled to the input of the monitoring circuit and an output for providing a reduced signal, wherein the reduced signal has a reduced current and a reduced voltage in comparison with the input signal; and
    a buffer circuit having an input coupled to receive the reduced signal and an output for providing a buffered signal, wherein the buffered signal is provided by a source of a field-effect transistor having a gate coupled to the source and further coupled to receive the reduced signal.

2. The monitoring circuit of claim 1, wherein the buffered signal is provided by the source of the field-effect transistor through a capacitor.

3. The monitoring circuit of claim 1, wherein the source of the field-effect transistor is further coupled to a ground through a resistor.

4. The monitoring circuit of claim 1, wherein a drain of the field-effect transistor is coupled to a power supply potential through an inductor.

5. The monitoring circuit of claim 1, wherein a drain of the field-effect transistor is coupled to a ground through a capacitive load providing broadband radio frequency bypassing.

6. The monitoring circuit of claim 5, wherein the capacitive load is a pair of parallel-coupled capacitors coupled between the drain of the field-effect transistor and a ground.

7. A monitoring circuit, comprising:
    an input coupled to receive an input signal from a radio frequency signal path;
    a voltage divider circuit having an input coupled to the input of the monitoring circuit and an output for providing a reduced signal, wherein the reduced signal has a reduced current and a reduced voltage in comparison with the input signal; and
    a buffer circuit having an input coupled to receive the reduced signal, an output for providing a buffered signal, and a field-effect transistor coupled between the input and output of the buffer circuit;
    wherein the field-effect transistor has a gate, a source and a drain;
    wherein the gate of the field-effect transistor is coupled to receive the reduced signal;
    wherein the source of the field-effect transistor is coupled to the gate of the field-effect transistor, to a ground through a resistor, and to the output of the buffer circuit; and
    wherein the drain of the field-effect transistor is coupled to receive a power supply potential through an inductor and is coupled to a ground through a capacitive load providing broadband radio frequency bypassing.

8. The monitoring circuit of claim 7, wherein the field-effect transistor is a metal semiconductor field-effect transistor.

9. The monitoring circuit of claim 7, wherein the source of the field-effect transistor is coupled to the gate of the field-effect transistor through a static protection diode.

10. The monitoring circuit of claim 7, wherein the source of the field-effect transistor is coupled to the output of the buffer circuit through a capacitor.

11. The monitoring circuit of claim 7, wherein the capacitive load is a pair of parallel-coupled capacitors coupled between the drain of the field-effect transistor and a ground.

12. A monitoring circuit, comprising:
    an input coupled to receive an input signal from a radio frequency signal path, the signal path having a characteristic impedance;
    a voltage divider circuit having a first resistor and a second resistor coupled in series with the first resistor coupled to the input of the monitoring circuit and the second resistor coupled to a ground, wherein the voltage divider circuit has an output node coupled between the first resistor and the second resistor; and
    a buffer circuit having a field-effect transistor having a gate, a source and a drain, wherein the gate is coupled to the output node of the voltage divider circuit and to the source, the drain is coupled to receive a power supply potential, and the source is coupled to an output of the monitoring circuit.

13. The monitoring circuit of claim 12, wherein the source of the field-effect transistor is coupled to the output of the monitoring circuit through a dc blocking capacitor.

14. The monitoring circuit of claim 12, wherein the drain of the field-effect transistor is further coupled to a ground through a capacitive load to provide broadband radio frequency bypassing for the buffer circuit.

15. The monitoring circuit of claim 14, wherein the capacitive load further comprises a first capacitor and a second capacitor coupled in parallel between the drain and the ground.

16. The monitoring circuit of claim 12, further comprising an adjustable capacitor coupled in parallel with the first resistor.

17. The monitoring circuit of claim 12, wherein the drain is coupled to receive the power supply potential through an inductor.

18. The monitoring circuit of claim 12, further comprising a third resistor coupled between the source of the field-effect transistor and a ground.

19. The monitoring circuit of claim 12, wherein the series combination of the first and second resistors is sized to be at least 10 times the characteristic impedance of the signal path.

20. A monitoring circuit, comprising:
means for reducing an input signal to have a reduced current and a reduced voltage; and
means for buffering the reduced input signal, wherein the means for buffering the reduced input signal includes a field-effect transistor having a gate, a source and a drain, and wherein the gate is coupled to the source and further coupled to receive the reduced input signal, the drain is coupled to receive a power supply potential through an inductor and further coupled to a ground through a pair of capacitors coupled in parallel, and the source is coupled to a ground through a resistor and further coupled to an output of the monitoring circuit.

21. The monitoring circuit of claim 20, wherein the source of the field-effect transistor is coupled to the output of the monitoring circuit through a capacitor.

22. The monitoring circuit of claim 20, wherein the field-effect transistor is metal semiconductor field-effect transistor having a built-in static protection diode.

23. The monitoring circuit of claim 20, wherein the means for reducing an input signal comprises a voltage divider circuit.

24. A monitoring circuit, comprising:
a first resistor and a second resistor coupled in series, wherein the first resistor is coupled to receive an input signal from a radio frequency signal path and the second resistor is coupled to a ground, and wherein the signal path has a characteristic impedance; and
a metal semiconductor field-effect transistor having a built-in static protection diode and having a gate, a source and a drain, wherein the gate is coupled to a node interposed between the first resistor and the second resistor and is further coupled to the source, wherein the drain is coupled to receive a power supply potential through an inductor and is further coupled to a ground through a capacitive load providing broadband radio frequency bypassing, and wherein the source is coupled to an output of the monitoring circuit and is further coupled to a ground through a third resistor.

25. The monitoring circuit of claim 24, wherein the first and second resistors are sized to attenuate the input signal by approximately 20 dB.

26. The monitoring circuit of claim 24, wherein the series combination of the first and second resistors is sized to be at least 10 times the characteristic impedance of the signal path.

27. The monitoring circuit of claim 24, wherein the source is coupled to the output of the monitoring circuit through a capacitor.

28. The monitoring circuit of claim 24, further comprising an adjustable capacitor coupled in parallel with the first resistor.

29. A method of monitoring a signal in a radio frequency signal path, the method comprising:
tapping the signal from the signal path;
dividing a voltage of the signal, thereby producing a reduced signal;
applying the reduced signal to a gate of a field-effect transistor; and
monitoring a source of the field-effect transistor, wherein the source is coupled to the gate of the field-effect transistor through a static protection diode and to a ground through a resistor.

30. The method of claim 29, wherein the field-effect transistor is a metal semiconductor field-effect transistor.

31. The method of claim 29, wherein a drain of the field-effect transistor is coupled to receive a power supply potential.

32. The method of claim 31, wherein the drain of the field-effect transistor is coupled to receive the power supply potential through an inductor.

33. The method of claim 31, wherein the drain of the field-effect transistor is further coupled to a ground through a capacitive load providing broadband radio frequency bypassing.

34. The method of claim 29, wherein monitoring the source of the field-effect transistor further comprises monitoring the source of the field-effect transistor at an output node, wherein the source of the field-effect transistor is coupled to the output node through a capacitor.

35. A method of monitoring a signal in a radio frequency signal path, the method comprising:
tapping the signal from the signal path;
dividing a voltage of the signal using a voltage divider circuit to produce a reduced signal, wherein the voltage divider circuit comprises a first resistor and a second resistor coupled in series, wherein the first resistor is coupled to receive the signal and the second resistor is coupled to a ground, and wherein the reduced signal is produced at a node interposed between the first and second resistors;
applying the reduced signal to a gate of a field-effect transistor; and
monitoring a source of the field-effect transistor, wherein the source is coupled to the gate of the field-effect transistor and is further coupled to a ground through a resistor, and wherein a drain of the field-effect transistor is coupled to a power supply potential through an inductor and is further coupled to a ground through a capacitive load providing broadband radio frequency bypassing.

36. The method of claim 35, wherein the source of the field-effect transistor is coupled to the gate of the field-effect transistor through a static protection diode.

37. The method of claim 35, monitoring the source of the field-effect transistor further comprises monitoring the source of the field-effect transistor at an output node, wherein a capacitor is coupled between the output node and the source of the field-effect transistor.

38. The method of claim 35, wherein the capacitive load is a pair of parallel-coupled capacitors coupled between the drain of the field-effect transistor and a ground.

39. The method of claim 35, wherein the voltage divider circuit further comprises an adjustable capacitor coupled in parallel with the first resistor.

40. A network amplifier, comprising:
an input for receiving a radio frequency signal from a distribution network;
an output for providing an amplified radio frequency signal to the distribution network;
at least one amplifier circuit coupled between the input and the output of the network amplifier for providing the amplified radio frequency signal; and
at least one monitoring circuit coupled to a radio frequency signal path between the input and the output of the network amplifier, wherein the at least one monitoring circuit comprises:
an input coupled to receive an input signal from the radio frequency signal path;
a voltage divider circuit having an input coupled to the input of the monitoring circuit and an output for providing a reduced signal, wherein the reduced signal has a reduced current and a reduced voltage in comparison with the input signal; and a buffer circuit having an input coupled to receive the reduced signal and an output for providing a buffered signal, wherein the buffered signal is provided by a source of a field-effect transistor;

wherein the source of the field-effect transistor is coupled to a gate of the field-effect transistor and further coupled to a ground through a resistor;

wherein the gate of the field-effect transistor is further coupled to receive the reduced signal; and wherein the field-effect transistor has a drain coupled to receive a power supply potential and further coupled to a ground through a capacitive load for broadband radio frequency bypassing.

41. The network amplifier of claim 40, wherein a monitoring circuit is coupled to the radio frequency signal path at a location selected from the group consisting of the input of the network amplifier, the output of the network amplifier, and an output of an amplifier circuit of the network amplifier.

42. The network amplifier of claim 40, further comprising an automatic gain control circuit coupled between a monitoring circuit and an amplifier circuit, wherein the automatic gain control circuit controls a gain of the amplifier circuit in response to the buffered signal of the monitoring circuit.

43. The network amplifier of claim 40, wherein the buffered signal is provided by the source of the field-effect transistor through a capacitor.

44. The network amplifier of claim 40, wherein the capacitive load is a pair of parallel-coupled capacitors coupled between the drain of the field-effect transistor and a ground.

45. The network amplifier of claim 40, wherein the field-effect transistor is a metal semiconductor field-effect transistor.

46. The network amplifier of claim 40, wherein the source of the field-effect transistor is coupled to the gate of the field-effect transistor through a static protection diode.

47. A network amplifier, comprising:
an input for receiving a radio frequency signal from a distribution network;
an output for providing an amplified radio frequency signal to the distribution network;
at least one amplifier circuit coupled between the input and the output of the network amplifier for providing the amplified radio frequency signal; and
at least one monitoring circuit coupled to a radio frequency signal path between the input and the output of the network amplifier, wherein the at least one monitoring circuit comprises:
an input coupled to receive an input signal from the radio frequency signal path, the signal path having a characteristic impedance;
a voltage divider circuit having a first resistor and a second resistor coupled in series with the first resistor coupled to the input of the monitoring circuit and the second resistor coupled to a ground, wherein the voltage divider circuit has an output node coupled between the first resistor and the second resistor; and
a buffer circuit having a field-effect transistor having a gate, a source and a drain, wherein the gate is coupled to the output node of the voltage divider circuit and to the source, the drain is coupled to receive a power supply potential, and the source is coupled to an output of the monitoring circuit.

48. The network amplifier of claim 47, wherein a monitoring circuit is coupled to the radio frequency signal path at a location selected from the group consisting of the input of the network amplifier, the output of the network amplifier, and an output of an amplifier circuit of the network amplifier.

49. The network amplifier of claim 47, further comprising an automatic gain control circuit coupled between a monitoring circuit and an amplifier circuit, wherein the automatic gain control circuit controls a gain of the amplifier circuit in response to the buffered signal of the monitoring circuit.

50. The network amplifier of claim 47, wherein the source of the field-effect transistor is coupled to the output of the monitoring circuit through a dc blocking capacitor.

51. The network amplifier of claim 47, wherein the drain of the field-effect transistor is coupled to a ground through a capacitive load to provide broadband radio frequency bypassing for the buffer circuit.

52. The network amplifier of claim 51, wherein the capacitive load further comprises a first capacitor and a second capacitor coupled in parallel between the drain and the ground.

53. The network amplifier of claim 47, further comprising an adjustable capacitor coupled in parallel with the first resistor.

54. The network amplifier of claim 47, wherein the drain of the field-effect transistor is coupled to receive the power supply potential through an inductor.

55. The network amplifier of claim 47, further comprising a third resistor coupled between the source of the field-effect transistor and a ground.

56. The network amplifier of claim 47, wherein the series combination of the first and second resistors is sized to be at least 10 times the characteristic impedance of the signal path.

57. A network amplifier, comprising:
an input for receiving a radio frequency signal from a distribution network;
an output for providing an amplified radio frequency signal to the distribution network;
at least one amplifier circuit coupled between the input and the output of the network amplifier for providing the amplified radio frequency signal; and
at least one monitoring circuit coupled to a radio frequency signal path between the input and the output of the network amplifier, wherein the at least one monitoring circuit comprises:
means for reducing an input signal to have a reduced current and a reduced voltage; and
means for buffering the reduced input signal, wherein the means for buffering the reduced input signal includes a field-effect transistor having a gate, a source and a drain, and wherein the gate is coupled to the source and further coupled to receive the reduced input signal, the drain is coupled to receive a power supply potential through an inductor and further coupled to a ground through a pair of capacitors coupled in parallel, and the source is coupled to a ground through a resistor and further coupled to an output of the monitoring circuit.

58. The network amplifier of claim 57, wherein a monitoring circuit is coupled to the radio frequency signal path at a location selected from the group consisting of the input of the network amplifier, the output of the network amplifier, and an output of an amplifier circuit of the network amplifier.

59. The network amplifier of claim 57, further comprising an automatic gain control circuit coupled between a monitoring circuit and an amplifier circuit, wherein the automatic gain control circuit controls a gain of the amplifier circuit in response to the buffered signal of the monitoring circuit.

60. A network amplifier, comprising:

at an input for receiving a radio frequency signal from a distribution network;

an output for providing an amplified radio frequency signal to the distribution network;

at least one amplifier circuit coupled between the input and the output of the network amplifier for providing the amplified radio frequency signal; and at least one monitoring circuit coupled to a radio frequency signal path between the input and the output of the network amplifier, wherein the at least one monitoring circuit comprises:

a first resistor and a second resistor coupled in series, wherein the first resistor is coupled to receive an input signal from a radio frequency signal path and the second resistor is coupled to a ground, and wherein the signal path has a characteristic impedance; and a metal semiconductor field-effect transistor having a built-in static protection diode and having a gate, a source and a drain, wherein the gate is coupled to a node interposed between the first resistor and the second resistor and is further coupled to the source, wherein the drain is coupled to receive a power supply potential through an inductor and is further coupled to a ground through a pair of parallel-coupled capacitors, and wherein the source is coupled to an output of the monitoring circuit and is further coupled to a ground through a third resistor.

61. The network amplifier of claim 60, wherein a monitoring circuit is coupled to the radio frequency signal path at a location selected from the group consisting of the input of the network amplifier, the output of the network amplifier, and an output of an amplifier circuit of the network amplifier.

62. The network amplifier of claim 60, further comprising an automatic gain control circuit coupled between a monitoring circuit and an amplifier circuit, wherein the automatic gain control circuit controls a gain of the amplifier circuit in response to the buffered signal of the monitoring circuit.

63. The network amplifier of claim 60, wherein the first and second resistors are sized to attenuate the input signal by approximately 20 dB.

64. The network amplifier of claim 60, wherein the series combination of the first and second resistors are sized to be at least 10 times the characteristic impedance of the signal path.

65. The network amplifier of claim 60, wherein the source is coupled to the output of the monitoring circuit through a capacitor.

66. The network amplifier of claim 60, further comprising an adjustable capacitor coupled in parallel with the first resistor.

* * * * *